Sept. 17, 1968   E. P. BRIGNAC ETAL   3,402,152
PROCESS FOR PREPARING A POLYAMIDE
Filed May 31, 1967

INVENTORS
EDMOND P. BRIGNAC
ROBERT T. WRIGHT
BY George R. Beck
ATTORNEY

United States Patent Office 3,402,152
Patented Sept. 17, 1968

3,402,152
PROCESS FOR PREPARING A POLYAMIDE
Edmond P. Brignac, Pensacola, and Robert T. Wright, Pensacola Beach, Fla., assignors to Monsanto Company, St. Louis, Mo., a corporation of Delaware
Continuation-in-part of application Ser. No. 367,749, May 15, 1964. This application May 31, 1967, Ser. No. 642,584
8 Claims. (Cl. 260—78)

ABSTRACT OF THE DISCLOSURE

This invention relates to the preparation of a polyamide from an aqueous solution of polyamide-forming reactants by a process which includes returning reactant vaporized during the polymreization reaction to the aqueous process feed.

CROSS-REFERENCE TO OTHER APPLICATIONS

Figure 1:
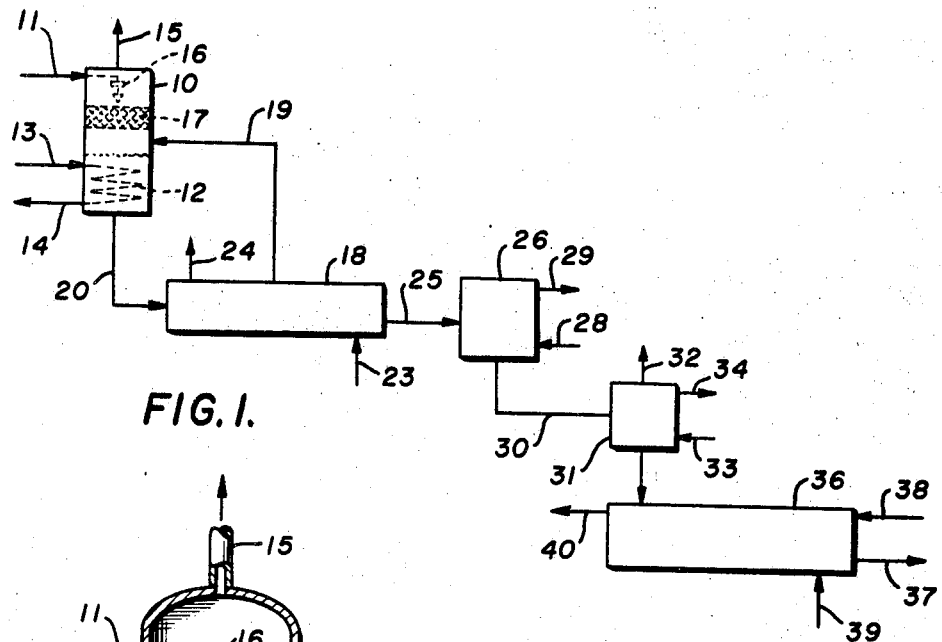

This application is a continuation-in-part of our copending application Ser. No. 367,749, which was filed on May 15, 1964, and is now abandoned.

BACKGROUND OF THE INVENTION

In the formation of polyamides, and particularly those that are useful in production of films and/or fibers, a high molecular weight polymer is normaly obtained by polycondensation of low molecular weight polymer that has been prepared from an aqueous solution of polyamide-forming reactants. The low molecular weight polymer is typicaly produced by a process in which the aqueous solution is first concentrated by evaporating water from the solution and the concentrated solution is then heated to a temperature sufficient to form low molecular weight polymer from the reactants. In general, the viscosity of the polymerizing mass increases substantially during production of the low molecular weight polymer and while the low molecular weight polymer is subsequently polycondensed to provide a higher molecular weight product having the desired degree of polymerization. The molecular weight or degree of polymerization of a high or low molecular weight polyamide is generaly most conveniently measured in terms of its relative viscosity which, as used herein, is intended to mean the ratio of the absolute viscosity (in centipoises) at 25° C. of an 11 weight percent solution of the polyamide in a 90% solution of formic acid in water to the absolute viscosity (in centipoises) at 25° C. of the 90% formic acid solution alone. Also as used herein, the term "low molecular weight polyamide" is intended to mean a polyamide having a relative viscosity (RV) below about 20 and the term "high molecular weight polyamide" represents a polyamide having a higher relative viscosity than the low molecular weight polyamide from which it was prepared.

In general, the aqueous solution of polyamide-forming reactants includes at least one organic dicarboxylic acid which preferably contains from four to twelve carbon atoms, for example an alkylene or aromatic dicarboxylic acid such as adipic, succinic, sebacic, terephthalic, isophthalic or naphthalic acid, and at least one organic diamine which preferably contains from four to twelve carbon atoms, for example an alkylene or aromatic diamine such as hexamethylene, tetramethylene, pentamethylene, heptamethylene, decamethylene, phenylene or naphthalene diamine. In the preparation of film and/or fiber-forming polyamides, these reactans are generally combined in proportions that are approximately stoichiometrically equivalent and dissolved in water to form a solution containing from about 25% to about 55% and preferably from 40% to 50% by weight of the reactants. Further treatment of such solutions, for example, by pH adjustment, inclusion of additives or purification, e.g. by an absorbent such as activated carbon, may be carried out before polymerization, if desired, to improve the properties of the ultimate polymeric product.

Most desirably, the aqueous solution of polyamide-forming reactants is first heated to evaporate water and thereby concentrate the solution to at least about 60% by weight of the reactants, for example at a temperature between about 105° and about 200° C. and a pressure between about one atmosphere and about 100 pounds per square inch gauge. Depending on the specific temperatures employed in the evaporator, the reactants may undergo some initial condensation reaction, e.g. with production of short chain polymers of the acid and diamine. In such cases, the apparent concentration of free water in the solution (based on the weights of the concentrated solution and the reactants in the solution before substantial condensation reaction) may be less than that actually present and may in some cases approach zero. Thereafter, the concentrated solution is most conveniently heated to a temperature between about 200° and about 275° C. at a substantially higher pressure such as, for example, between about 150 and about 300 pounds per square inch gauge, to form a low molecular polyamide generally having an RV (under those conditions) between about 5 and about 20 and to evaporate additional water from the solution. Thereafter, the low molecular weight polyamide is further polycondensed to produce a high molecular weight film and/or fiber forming polyamide by methods known in the art and more fully described hereinafter.

In the past, the highest concentration of reactants obtained in the aforedescribed evaporation step has been generally on the order of about 75% by weight, and attempts to concentrate the solution further before substantial polymerization of the reactants have normally resulted in significant reactant losses by volatilization, consequent upsets in the desired proportion of acid and diamine in the solution, and resulting decreases in the relative viscosity and tenacity of the ultimate polymeric product. On the other hand, when solutions containing a high proportion of water, e.g., as much as 25% by weight or more, are fed to the polymerization step of the process, the heat required to raise the insufficiently concentrated solution to the polymerization temperature is excessive and complications arise from the need for removal of large amounts of water vapor from the polymerization reactor. Accordingly, a process by which a polyamide characterized by high relative viscosity and high tenacity (e.g. after being spun into fibers) can be prepared from an aqueous solution of polyamide-forming reactants without the aforementioned difficulties is very desirable, and it is an object of this invention to provide such a process.

SUMMARY OF THE INVENTION

In accordance with the present invention, a polyamide having very desirable properties of high relative viscosity and high tenacity after being spun into fibers can be prepared from an aqueous solution of polyamide-forming reactants by feeding the solution to an evaporation zone, concentrating the solution in said zone by evaporating water from the solution, heating the concentrated solution in a reaction zone at a temperature sufficient to form low molecular weight polyamide from said reactants, and returning reactant vaporized in the reaction zone to the aqueous feed to the evaporation zone.

DESCRIPTION OF THE DRAWING AND PREFERRED EMBODIMENTS OF THE PROCESS

Figure 2:
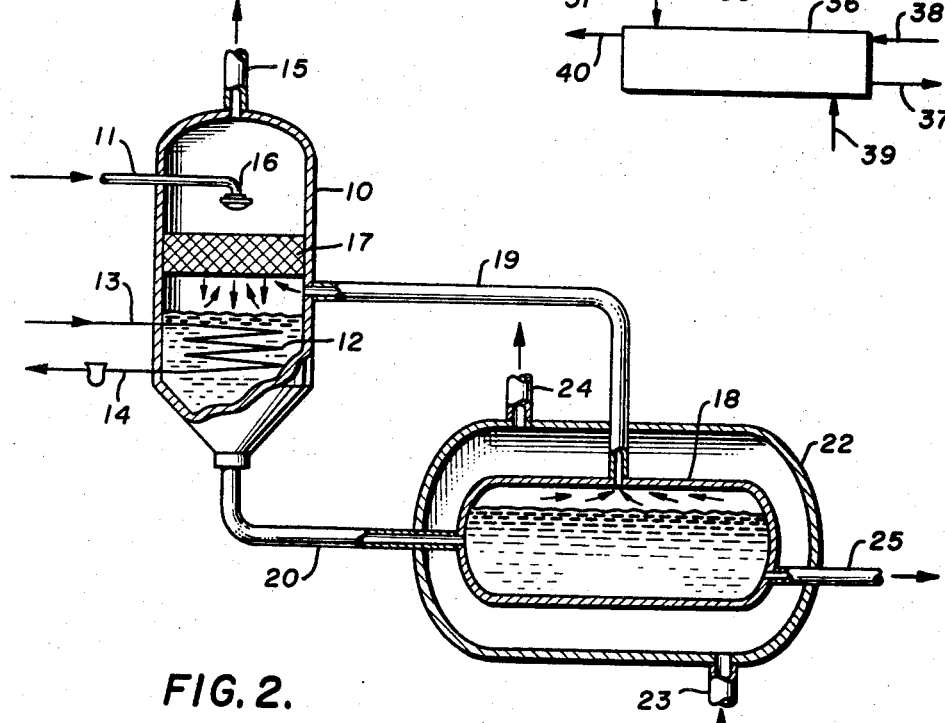

The invention will be more readily understood by reference to the following detailed description taken in conjunction with the accompanying drawing in which:

FIGURE 1 is a schematic flow diagram representing the preparation of a polyamide by a continuous system employing the process of this invention; and FIGURE 2 is a sectional elevation of specific equipment with which the process of this invention can be carried out.

Although the system and equipment shown in the drawing can be employed in polymerization of any of the aforementioned types of polyamide-forming reactants, it is particularly useful in preparing polymers of adipic or terephthalic acid and hexamethylene diamine, and it is with reference to those specific reactants that the invention will be described hereinafter.

Referring now to FIG. 1, the system shown therein comprises an evaporator 10, a reactor 18, a flasher 26, a prefinisher 31 and a finisher 36. In operation, a relatively unconcentrated aqueous solution containing an organic diamine such as hexamethylene diamine and an organic dicarboxylic acid such as adipic or terephthalic acid or a salt of such a diamine and acid is fed continuously through line 11 to evaporator 10 wherein the solution is concentrated under conditions of elevated temperature and superatmospheric pressure by evaporation of water from the solution. The solution may be heated in evaporator 10 by circulation of any suitable heating medium such as steam or Dowtherm through a heating coil 12 via inlet line 13 and outlet line 14. Water evaporated from the solution in evaporator 10 may be removed from the system thorugh an overhead line 15. As shown, evaporator 10 contains a baffle or spray device 16 that distributes the unconcentrated reactant solution entering by line 11 over a liquid-vapor contacting section 17 adapted to provide intimate contact between the downwardly flowing unconcentrated solution and vapors rising from the evaporation zone below. Such intimate contact can be provided in section 17 by any suitable means such as, for example, vapor-liquid contacting trays or packing, vertical or inclined surfaces on which a thin film of liquid can flow downwardly in contact with vapors ascending from below, etc. In one embodiment, section 17 can contain vapor-liquid contact packing such as ceramic saddles (e.g. ½ inch), Raschig rings or the like, most advantageously in a depth of one to two times the diameter of the packed section.

In a preferred embodiment of the process, the aqueous solution fed to evaporator 10 contains 25 to 55% by weight of hexamethylene diammonium adipate and may be prepared by mixing approximate stoichiometric equivalents of hexamethylenediamine and adipic acid in water sufficient to provide a solution of the desired concentration. The resulting solution of hexamethylene diammonium adipate is then sprayed into evaporator 10, as aforesaid, from above section 17 and permitted to flow downwardly through section 17 to the area surrounding heating coil 12 by which the solution is heated to a temperature between about 105° and about 200° C. while under a pressure of from about one atmosphere to about 100 pounds per square inch gauge to concentrate the solution to at least about 60% by weight of the reactants. In some cases, initial condensation of reactants in the evaporator may raise the relative viscosity of the concentrated solution, for example up to about 5.

Thereafter, the solution is continuously withdrawn from evaporator 10 via line 20 and fed to reactor 18 in which it is subjected to polymerization conditions that normally include a temperature between about 200° and about 275° C. and a pressure between about 150 and about 300 pounds per square inch gauge. Reactor 18 may be any suitable heat exchange vessel through which the polymerizing mixture can flow during application of heat and pressure. In another preferred embodiment of the process, the concentrated aqueous solution from the evaporator is heated in reactor 18 until the relative viscosity of the polymer thereby produced is between about 5 and about 20. The resistance time required to achieve such an RV is normally between about 30 minutes and about 3 hours. During that time, the polymerizing mass is advantageously agitated to assist in heat transfer and evaporation of volatile side products (such as water) which are continuously removed from reactor 18 via line 19 together with any reactant vaporized therewith.

In accordance with the process of this invention, reactant vaporized in reactor 18 is withdrawn therefrom via line 19 and returned to the unconcentrated aqueous solution by feeding it into the vapor space above the liquid level in evaporator 10 where it is condensed by contact and recombined with the aqueous solution descending from contacting section 17. Water vaporized in reactor 18 is generally withdrawn therefrom and fed into evaporator 10 in a vaporous mixture containing the reactant with which it is vaporized and, after upward passage through the descending aqueous feed solution, such water vapor is preferably withdrawn from the system, e.g. via line 15.

In a particularly preferred embodiment of the process, an aqueous solution of hexamethylene diammonium adipate can be concentrated to more than 75% by weight with an evaporator temperature of 130° to 165° C. and a pressure of 15 to 50 p.s.i.g. wthout an overhead loss of hexamethylenediamine in excess of 0.15% by weight or substantial upset of the desired molar ratio of diamine and acid in the concentrated solution that passes from evaporator 10 to reactor 18 via line 20. In the reactor, the concentrated solution may be conducted through an elongated (e.g. tubular) vessel heated by a fluid heat exchange medium such as steam or Dowtherm which may be circulated through an outer shell of the vessel at a temperature of from 220° to 275° C. A pressure in the reactor of 220 to 275 p.s.i.g. is usually preferred for conversion of the concentrated solution to a low molecular weight polymeric product, i.e., a polyamide having a relative viscosity of from about 5 to about 20. Although the preferred residence time in the reactor is dependent on various factors such as the specific reactants involved, the desired low molecular weight product is usually obtained after about 30 minutes to about 2 hours.

Thereafter, the low molecular weight polymer can be withdrawn from reactor 18 through line 25 to a pressure reduction unit or flasher 26 in which it is quickly and continuously brought to a substantially lower pressure, e.g. about one atmosphere, for evaporation of occluded water or other polymerization byproducts to further increase the relative viscosity of the product. It is also desirable to simultaneously provide additional heat to replace that normally lost during the flashing operation, for example by passing a suitable heating medium through flasher 26 via inlet and outlet conduits 28 and 29, respectively.

The polymeric product from flasher 26 is generally very viscous and, because of the turbulence of the flashing operation, may have a somewhat foamy consistency. Certain additives which can be used to enhance the light stability, heat resistance or other properties of the final polymer may also cause foaming in the flasher. To overcome that problem, the partially polymerized mixture from flasher 26 can be fed continuously to prefinisher 31 wherein thin films of the mixture are formed to facilitate the vaporization of occluded water and reaction byproducts which may then be conveniently withdrawn from the system, e.g. via line 32, without substantial loss of product. The thin films of the polymer are also desirably heated, e.g. by a heat exchange medium which may be passed through prefinisher 31 via inlet line 33 and outlet line 34 to drive the polymerization reaction to completion in a relatively short period of time. The thin films of polymer may be formed in the prefinisher, if desired, by continuously feeding the flasher effluent horizontally and tangentially into a substantially vertical cylindrical upper portion of prefinisher 31, in which it can be heated while driven downward or permitted to fall in a swirling manner. A conventional prefinisher contains an axial vapor space through which water vapor and undesirable low molecular weight constituents of the mixture can rise and be withdrawn from the system via line 32. In the preparation of polyhexamethylene adipamide, the prefinisher temperature is preferably 260° to 300° C. and its pressure is controlled at the level necessary to produce a polymer of the desired molecular weight.

The continuous polymerization process can be completed, if desired, in a finisher 36 which may be of any suitable type such as a heated horizontal screw conveyor and which should provide a steady stream of polymeric product without permitting stagnation of any portion of the polymer flow. The pressure in finisher 36 may be subatmospheric, atmospheric or superatmospheric, and the temperature of the reaction mixture should be 260° to 300° C. or higher, depending on the desired properties of the polymeric product. An appropriate temperature can be maintained by circulating a suitable heating medium through the unit, e.g. via inlet line 39 and inlet line 40. If desired to facilitate removal of a small remaining amount of water and/or other low molecular weight byproducts, the mixture may be contacted with an inert gas, preferably in countercurrent flow such as from inlet line 38 through finisher 36 and prefinisher 31 to outlet line 32. After a residence time of 10 minutes to 3 hours in finisher 36, a fully polymerized product of high relative viscosity is withdrawn from the system through line 37.

In FIG. 2, more specifically illustrated equipment which may be employed in the process of this invention is numbered in correspondence with like components in FIG. 1. Evaporator inlet line 11 feeds through a spray device 16 that may be replaced with any suitable means for substantially uniformly distributing the aqueous solution over liquid-vapor contacting section 17 which may contain any structure (e.g. bubble-cap or sieve trays) or material (e.g. ceramic saddles, Raschig rings, etc.) suitable for intimate liquid-vapor contact. Although not necessary, it is generally most advantageous if section 17 contains the equivalent of at least one to two theoretical distillation plates.

The followig examples are included to illustrate the advantages of the process of this invention for producing a low molecular weight polyamide with recycle of reactant vaporized during formation of the low molecular weight polymer and are not intended to be representative of any limitation of the scope of the invention. Percentages are by weight except where noted otherwise.

Example I

Polyhexamethylene adipate was prepared from an aqueous solution containing 45% hexamethylene adipate in a system of the type shown in FIG. 1 wherein the aqueous solution was distributed over a liquid-vapor contacting section for intimate contact with vapors ascending from below. The liquid in the evaporation zone beneath the contacting section was maintained at a temperature of 115° C. and a pressure of 13 p.s.i.g. Residence time in the evaporator was regulated so that the salt concentration in the solution entering the reactor was at least about 75%. Reactor pressure was maintained at 250 p.s.i.g. and the polymerizing mixture was heated so that the low molecular weight polymer discharged therefrom had a temperature of 245° C. Reactant-containing vapor evolved in the reactor was withdrawn and then condensed and recombined with the unconcentrated aqueous solution by feeding it into the vapor space above the liquid level in the evaporator. The subsequent process steps of flashing, prefinishing and finishing were performed in conventional equipment at atmospheric pressure and with addition of heat sufficient to increase the polymer temperature incrementally from a reactor discharge temperature at 245° C. to a finisher discharge temperature of 285° C. Gas inert to the polymerizing mixture was conducted through the finisher and prefinisher countercurrent to the polymer flow and at a rate of 1.5 cubic feet per pound of the polymeric product, which had a relative viscosity of 70. After being discharged from the finisher, the polymer was melt-spun by a conventional technique to provide a 140 filament yarn having an 840 denier. The yarn tenacity and ultimate elongation, as determined with a Scott IP–4 test device, were 9.5 grams per denier and 17%, respectively. Samples of the yarn were then processed into cord by giving each of two 840/140 threadlines 12 turns per inch in an S direction and then plying and twisting those two threadlines 12 turns per inch in a Z direction to provide a balanced, twisted, plied cord. The cord was then coated with a conventional nylon-to-rubber adhesive and hot-stretched. The ultimate strength of the resulting cord, as determined with a Scott X–3 test device, was 34.9 pounds. Samples of the cord were then used in the manufacture of size 8.00 by 14 tires, which were tested for durability by running on a smooth indoor surface at 60 miles per hour and 100° F. under a 1700 pound load per tire. At a pressure of 30 p.s.i.g., the tires failed after 5000 miles of wear.

COMPARATIVE EXAMPLE A

Polymer, yarn, cord and tires were prepared and tested in accordance with the procedure of Example I with the exception that the liquid-vapor contacting section was omitted and reactant vaporized in the reactor was not recycled to the evaporator. The relative viscosity of the polymeric product was 70. The tenacity and ultimate elongation of the yarn were 8.8 grams per denier and 16%, respectively. The ultimate strength of the cord was 31.5 pounds and the tires failed after 2500 miles of wear.

COMPARATIVE EXAMPLE B

Polymer, yarn, cord and tires were prepared and tested in accordance with the procedure of Example I with the exception that the evaporation zone was directly above and in open communication with the reactor so that during concentration in the evaporator and initial polymerization, the descending solution was continuously and countercurrently contacted by a stream of ascending vapors composed of the water and reactant vaporized in the reactor. Reactant not condensed during upward passage through the evaporation zone was collected overhead, condensed and recombined with the unconcentrated aqueous solution being fed to the evaporation zone from above. Since the evaporator and reactor were in open communication, they were maintained at an intermediate pressure of 130 p.s.i.g. As the aqueous solution descended through the evaporation zone, its temperature gradually increased from 175° C. to 242° C. Polymer discharged from the reactor had a temperature of 280° C. Flashing, prefinishing, finishing, melt-spinning, cord preparation and tire manufacture were carried out as described in Example I. The polymeric product from the finisher had a relative viscosity of 50. The tenacity of the yarn was 8.2 grams per denier. The ultimate strength of the cord was 29 pounds and the tires failed after 1300 miles of wear.

Example II

Polymer, yarn, cord and tires were prepared and tested in accordance with the procedure of Example I with the exception that the flow rate of inert gas through the finisher and prefinisher was one cubic foot per pound of polymer produced. The relative viscosity of the polymeric product was 58. The tenacity and ultimate elongation of the yarn were 9.2 grams per denier and 18%, respectively. The ultimate strength and impact strength of the cord, as determined with a Scott X–3 test device, were 33.4 pounds and 0.49 gram centimeters per dyne centimeter, respectively. The tires failed after 3090 miles of wear.

COMPARATIVE EXAMPLE C

Polymer, yarn, cord and tires were prepared and tested in accordance with the procedure of Example II with the exception that the liquid-vapor contacting section was omitted and reactant vaporized in the reactor was not recycled to the evaporator. The relative viscosity of the polymeric product was 58. The tenacity and ultimate elongation of the yarn were 8.7 grams per denier and 17.3% respectively. The ultimate strength and impact strength of the cord were 31 pounds and 0.43 gram centimeters per dyne centimeter, respectively. The tires failed after 2495 miles of wear.

Example III

Polyhexamethylene terephthalate was prepared from an aqueous solution containing 30% hexamethylene terephthalate in a system of the type shown in FIG. 1 wherein the aqueous solution was distributed over a liquid-vapor contacting section for intimate contact with vapors ascending from below. The liquid in the evaporation zone beneath the contacting section was maintained at a temperature of 147° C. and a pressure of 30 p.s.i.g. Residence time in the evaporator was regulated so that the salt concentration in the solution entering the reactor was at least about 75%. Reactor pressure was maintained at 250 p.s.i.g. and the polymerizing mixture was heated so that the low molecular weight polymer discharged therefrom had a temperature of 262° C. Reactant-containing vapor evolved in the reactor was withdrawn and then condensed and recombined with the unconcentrated aqueous solution by feeding it into the vapor space above the liquid level in the evaporator. The subsequent process steps of flashing, prefinishing and finishing were performed in conventional equipment with prefinisher and finisher essentially at atmospheric pressure and with addition of heat sufficient to increase the polymer temperature incrementally from a reactor discharge temperature of 262° C. to a finisher discharge temperature of 287° C. Gas inert to the polymerizing mixture was conducted through the finisher and prefinisher countercurrent to the polymer flow and at a rate of 0.7 cubic feet per pound of the polymeric product, which had an intrinsic viscosity of 0.907. After being discharged from the finisher, the polymer was melt-spun by a conventional technique to provide a 210 filament yarn having a 1260 denier. The yarn tenacity and ultimate elongation, as determined with an Instron test device, were 7.93 grams per denier and 16.5%, respectively. Samples of the yarn were then processed into cord by giving each of two 1260/210 threadlines 10 turns per inch in a Z direction and then plying and twisting those two threadlines 10 turns per inch in an S direction to provide a balanced, twisted, plied cord. The cord was then coated with a conventional nylon-to-rubber adhesive and hot-stretched. The ultimate strength of the resulting cord, as determined with a Scott X-3 test device, was 39.9 pounds. Samples of the cord were then used in the manufacture of size 8.25 by 14 tires, which were tested for durability by running on a smooth indoor surface at 45 miles per hour and 100° F. under an 1815 pound load per tire. At a pressure of 20 p.s.i.g., the tires failed after 3354 miles of wear.

COMPARATIVE EXAMPLE D

Polymer, yarn, cord and tires were prepared and tested in accordance with the procedure of Example III with the exception that the liquid-vapor contacting section was omitted, reactant vaporized in the reactor was not recycled to the evaporator and the flow rate of gas through the finisher and prefinisher was 0.95 cubic feet per pound of the polymeric product, which had an intrinsic viscosity of 0.9. The tenacity and ultimate elongation of the yarn were 7.6 grams per denier and 17.1%, respectively, and the ultimate strength of the cord was 36.3 pounds.

Although the invention has been described herein with preferred embodiments, many modifications and variations thereof may be employed without departing from the spirit and scope of the invention. Accordingly, it is to be understood that the invention is not limited to such specific embodiments except as it is defined in the appended claims.

We claim:

1. A process for preparing a polyamide which comprises feeding an aqueous solution containing between about 25% and about 55% by weight of polyamide-forming reactants consisting essentially of organic dicarboxylic acid and organic diamine to an evaporation zone, concentrating the solution in said zone to at least about 60% by weight of said reactants by evaporating water from the solution between about 105° and about 200° C. and between about one atmosphere and about 100 p.s.i.g., heating the concentrated solution in a reaction zone between about 200° and about 275° C. and between about 150 and about 300 p.s.i.g. to form low molecular weight polyamide from said reactants, and returning reactant vaporized in the reaction zone to the aqueous feed to the evaporation zone.

2. A process as defined in claim 1, in which reactant vaporized in the reaction zone is condensed in contact with the aqueous feed to the evaporation zone.

3. A process as defined in claim 1, in which the reactants include an aromatic or alkylene dicarboxylic acid containing from four to twelve carbon atoms.

4. A process as defined in claim 1, in which the reactants include adipic or terephthalic acid.

5. A process as defined in claim 1, in which the reactants include an aromatic or alkylene diamine containing from four to twelve carbon atoms.

6. A process as defined in claim 1, in which the reactants include hexamethylene or phenylene diamine.

7. A process as defined in claim 1, in which reactant vaporized in the evaporation zone is condensed in contact with the aqueous feed to the evaporation zone.

8. A process as defined in claim 1, which further comprises polycondensing the low molecular weight polyamide to produce a high molecular weight polyamide useful in forming fibers.

References Cited

UNITED STATES PATENTS

| | | | |
|---|---|---|---|
| 2,130,948 | 9/1938 | Carothers | 260—78 |
| 2,562,796 | 7/1951 | Koch | 260—78 |
| 2,908,666 | 10/1959 | Notarbartolo | 260—78 |
| 3,003,222 | 10/1961 | Pitzl | 260—78 |
| 3,090,997 | 5/1963 | Au | 260—78 |
| 3,093,881 | 6/1963 | Zimmerman | 260—78 |
| 3,296,217 | 1/1967 | Tate | 260—78 |

FOREIGN PATENTS

| | | |
|---|---|---|
| 854,223 | 11/1960 | Great Britain. |
| 890,437 | 2/1962 | Great Britain. |

WILLIAM H. SHORT, *Primary Examiner.*

H. D. ANDERSON, *Assistant Examiner.*